United States Patent Office 3,849,555
Patented Nov. 19, 1974

3,849,555
METHOD FOR MODIFYING SOUR AND BITTER TASTE
Robert J. Harvey, Sudbury, Mass., assignor to Mirlin Corporation, Wayland, Mass.
No Drawing. Filed Apr. 15, 1970, Ser. No. 28,962
Int. Cl. A61k 27/14
U.S. Cl. 424—195                                    9 Claims

ABSTRACT OF THE DISCLOSURE

Normally sour tasting or bitter tasting foods are rendered sweet tasting by first contacting the tongue with the active principle of *Synsepalum dulcificum* Daniell Sapotaceae to modify the taste receptors of the tongue. Food to be ingested is admixed with an acidic composition comprising at least one non-toxic normally sour tasting carboxylic acid.

---

This invention relates to a method for modifying the taste of sour or bitter foods to render them sweet tasting.

*Synsepalum dulcificum* Daniell, Sapotaceae is a plant indigenous to West-Central Africa which bears a red ellipsoid fruit commonly known as "miracle fruit." The fruit has a palatable pulp and skin and contains a large seed. It is characterized by a pleasant taste and by the unique property, well-recognized for over 200 years, of modifying the sweet and sour tastes in an unusual manner. It has been found that a component in the fruit depresses the sour taste and accentuates the sweet taste of any normally sour food eaten within a short period after first contacting the tongue with the pulp of fresh miracle fruit, thus causing the normally sour food to taste pleasantly sweet. By exposing the taste receptors on the tongue to miracle fruit, any sour tasting food can be made to taste sweet without the addition of sugar or artificial sweeteners. The taste-modifying principle in the miracle fruit known as miraculin, binds itself to the taste receptors thus altering the sensory perception of the sour taste in foods eaten after the miracle fruit. For example, fresh lemon can be made to taste pleasantly sweet by first eating a miracle fruit berry. However, the effect of miracle fruit observed on sour-tasting foods has not been observed for bitter-tasting foods. In addition, the affect of miracle fruit on sour-tasting foods is limited so that when increased sweetness is desired, increased amounts of miracle fruit are required.

It has been determined that miraculin is a glycoprotein having a molecular weight of about 44,000. A wide variety of approaches have been explored in attempts to isolate the active component in miracle fruit for subsequent use as a taste modifying material. These attempts have met only with limited success since the form of the product obtained by these methods is less effective than the natural fruit and was found to be highly unstable at normal room temperatures under normal atmospheric conditions. This instability necessitated either very quick use after isolation or storage at very low temperatures. This instability is not confined to the concentrates obtained by present processes but is also a characteristic of the fruit itself. The fruit must be consumed within a very short period after picking or it will be ineffective in modifying the sour taste.

The prior art has regarded miraculin as a very labile material accounting for the observed instability of concentrates maintained at normal room temperatures. While some degree of success has been attained in improving stability of miraculin-containing material in the order of about a week or so, it has been found that stability could not be achieved when maintained in powder form at room temperatures. Alternatively, the miraculin-containing material was dissolved in specific solvents maintained at specific pH conditions. These solutions had to be refrigerated to be preserved, and even then this material was not as effective as the natural fruit.

A novel powdered form of the miraculin glycoprotein obtained from miracle fruit which is stable for long periods of time of a year or more at normal room conditions and its method of preparation is disclosed in copending application Ser. No. 28,981, now U.S. Pat. No. 3,676,149, issued July 11, 1972 filed concurrently herewith in the names of Robert J. Harvey and J. Richard Fennell entitled "Taste-Modifying Composition and Method of Preparation."

The product disclosed in the copending application is a stable white powder comprising miraculin; either alone or admixed with material inert with respect to the characteristic of suppressing sour taste but excluding components of the fruit that degrade miraculin including materials containing enzymes and/or acids that degrade the miraculin. The product exhibits remarkable stability in powdered form at room temperature. This is indeed surprising in view of the prior art which regarded the miraculin to be highly unstable and thermolabile such that it was thought necessary to maintain powdered concentrates in a frozen condition or in a dry atmosphere or to refrigerate solutions of the active principle obtained by the prior art processes to retain the desired stability over reasonably long periods of time.

The stability of the powdered product obtained by the processes disclosed in the above copending application facilitates formation of unit dosage forms therefrom. However, the product when employed alone is not suitable for improving the taste of bitter foods. It would be desirable to provide compositions containing the active material or methods employing the active material whereby the taste of bitter foods in addition to sour foods could be modified to taste sweet.

In accordance with the process of the invention disclosed in the above-identified co-pending application, a stable miraculin-rich composition is obtained by comminuting depitted ripe miracle fruit containing miraculin and then separating the vaporous and liquid components including acids and enzymatic components of the ripe fruit that degrade miraculin from the miraculin-rich material. The liquid and vaporous components are separated by dehydration and the enzymatic components are separated by any means that effects separation on the basis of density.

To minimize miraculin loss after picking, the whole fruit can be frozen to very low temperatures to await processing or the pulp and skin can be processed immediately after picking to obtain the concentrated miraculin. Comminution of the fruit serves to fracture the cell walls and thereby expose substantially all of the miraculin and facilitate subsequent processing. Dehydration can be effected in any convenient manner wherein low temperatures can be obtained including lyophilization, foam separation, spray drying or similar dehydration processes and can preceed or follow the separation step based on density. It is preferred to separate the high density miraculin from the low density enzyme-rich material following dehydration because of the increased efficiencies obtained thereby. If the miraculin is not separated from the material containing the enzyme, the product is unstable and will be degraded quickly at normal room conditions so that it loses its taste-modifying effect. The miraculin-rich material, substantially free of the degrading enzyme and/or acids, has a substantially higher density than the material containing the enzyme. Therefore, the separation of the miraculin, that may contain some cellulosic material, from material containing the enzyme is effected by processes that separate materials on a density basis. To facilitate this separation, the mixed pulp and miraculin is preliminarily comminuted and screened to obtain uniformly small particle size.

The preferred process of the invention disclosed in the above-identified co-pending application is based upon the discovery that degradation of miraculin in the fruit is initiated immediately after the ripe fruit is picked, and that degradation of the active principle in its natural environment is accelerated by increased temperature and by contact with air. Thus, it is preferred to process the ripe miracle fruit as quickly as possible, at as low temperature as possible, and in a non-oxidizing atmosphere, to obtain a high yield of miraculin. Preferably, the picked fruit is washed in water and then depitted at about 1 to 40°C. The fruit can be stored in a frozen state to await processing or can be processed immediately to obtain the active principle. When stored, temperatures of about −40° C. or less are employed to arrest degradation since it has been found that degradation of the active principle in the frozen fruit occurs even when stored at temperatures of about −15° C. Since it is difficult to remove the pit or seed from the frozen berry, it is preferred to depit the berry prior to frozen storage. The depitted berry, regardless of whether it has been stored previously or whether it is processed directly after having been picked, is comminuted in a frozen state either alone or together with Dry Ice or ice formed from pyrogen-free distilled water. When the berry is processed immediately after having been picked, the pulp and skin obtained from the depitting step are directed into a container placed in a low temperature bath which itself may contain crushed Dry Ice. The pulp and skin are then comminuted at low temperatures such as by blending, grinding or ball-milling with ball milling in a shell freezer being preferred.

The separation of the miraculin-rich material from the enzyme-rich material is based upon the fact that the active principle is considerably more dense than the enzyme-rich material in the order of about 10 times as dense. Thus, the mixture of inerts and active material described above can be separated by any convenient density separation method including settling from a suspension of the mixture in liquid, the use of fluidizing bed technique, or through the use of cyclone type centrifuge. Some separation of miraculin-rich material from enzyme-rich material can be effected prior to dehydration by placing the comminuted pulp in settling pans at a temperature of 1-4° C. until the highest density material has settled in the bottom. The settling is complete in a short period of about 20 minutes with the miraculin-rich material forming the lowest layer which is then separated. The material then is frozen to below about −40° C. and dehydrated. The preferred separation method is conducted after dehydration and utilizes a cyclone type centrifuge for dry powder following dehydration described in the examples. The miraculin-rich material has a density in excess of 1 g./cc. while the enzyme-rich cellulosic material has a density of less than about 0.5 g./cc. since the high density material is white and the low density material is brown the separate layers can be easily and quickly identified on the basis of color. To obtain the desired product stability, enzyme-rich material concentration should be as low as possible with removal in the order of about 95% having been found to be adequate.

In accordance with this invention, miraculin, preferably the stable form of miraculin; obtained from miracle fruit is employed in conjunction with at least one non-toxic acid to render sour and/or bitter tasting food sweet tasting. In one aspect, the present invention is based upon the discovery that a bitter tasting food, mixed with a non-toxic acid and ingested is made to taste sweet after the sour-taste buds have been modified with the stable miraculin. In another aspect of this invention, it has been found that the sweetening affect of the stable miraculin on sour tasting foods can be enhanced greatly by incorporating therein certain acidic compositions.

While the mechanism by which the stable miraculin modified taste is not known precisely, it is believed that it alters the taste receptors on the tongue such that the response of the sour receptors is suppressed, while the response of the salt and the sweet receptors are increased, when a sour acid is simultaneously applied with the other receptor stimulant. However, bitter taste is normally unaffected by miraculin. Therefore, if one eats a bitter food after first exposing the tongue to miraculin, the taste of the bitter food is basically unaltered. However, when one first adds an acid to the bitter food and then tastes it after having exposed the tongue to miraculin, then the normally bitter food tastes pleasantly sweet. Furthermore, by selecting the appropriate acid, one can concomitantly and selectively flavor the normally bitter tasting food without significantly changing the overall flavor. This has the advantage of broadening the application of stable miraculin to include a wide range of foods encompassing most of the foods in which sugar is usually added to counteract sour, bitter, or a combination of both sour and bitter. Furthermore, this provides a means of obtaining a graded sweet response, rather than just a fixed, uncontrolled amount of sweetness.

In the present invention, the tongue is contacted with the active principle to modify the sour taste receptors. The sour or bitter food containing the acid then is ingested. In the case of bitter tasting foods, the sour acid is rendered sweet tasting thereby masking the bitter taste. In the case of sour tasting foods already containing sour acids, the addition of acidic compositions dramatically improve the sweetness of the food ingested.

Suitable non-toxic acids include naturally occurring carboxylic acids such as citric, malic, ascorbic, formic, acetic, tartaric or inorganic acids in low concentrations or mixtures thereof. It should be understood that the acids can be added as pure acids or in their natural form. Thus, the acids can be added to the foods as lime, lemon or apple juice or the like.

The acid is added to the food in amounts to obtain an effective acid molarity in the food of between .001M and 0.1M, preferably .005M to .03M. By "effective molarity" it is meant the amount of acid in the food which when dissolved, produces the same sweetening effect of an aqueous acid solution having the molarity set forth above. When the acid is added in equivalent amounts below .001M or above 0.1M, it is ineffective to produce the desired result in conjunction with miraculin and renders the food to which it is added sour-tasting. The effective molarity of acid is obtained by mixing aqueous acid concentrates of about 0.1M to 0.3M with the food. Acid concentrates in excess of about 0.3M are undesirable because the risk of denaturing the food is greatly increased. Generally, the desired effective molarity can be attained by mixing the food with from 0.1 to 0.7 weight percent acid solution. The particular amount of acid and desired effective molarity will depend upon the particular food eaten, the degree of sweetness desired and the particular acid employed.

In one aspect of this invention, the acid composition mixed with the food also can contain a small amount of sugar. It has been found that when some acid compositions mixed with small amounts of sugar are added to foods the sweetness attained when used in conjunction with miraculin greatly exceeds that provided by any of the individual acid constituents or mixtures of or pair of them. The amount of sugar added to the acid mixtures is less than about 20 percent of the sugar used to obtain the same degree of sweetness. Specific acid-sugar compositions exhibiting the greatly increased sweetness described are shown in Table I.

TABLE I

| | Weight percent, composition No. — | | |
|---|---|---|---|
| | 1 | 2 | 3 |
| Citric acid | 10 | | 15 |
| Malic acid | 25 | | |
| Ascorbic acid | | 25 | |
| Formic acid | | | 20 |
| Sucrose | 65 | 75 | 65 |

While the present invention has been described with reference to the active principle obtained by the process set forth in the cited copending application, it is to be understood that the present invention is applicable for use in conjunction with the active principle of miracle fruit regardless of source. To obtain the desired effect, miraculin is employed in unit dosage forms in amounts of from 0.6 to 50 milligrams, usually from 10 to 50 milligrams.

Example I

Unsweetened tea drunk both before and after having contacted the tongue with miraculin has substantially the same sweetness. However, after having ingested miraculin a cup of tea admixed with betwen 0.15 and 0.50 gram of a composition comprising 10% citric acid, 25% malic acid and 65% sucrose the sweetness of the tea is the same as when it is mixed with from 1 to 2 teaspoons of sugar. The same sweetening effect can be attained when the tea is mixed with lemon juice or the acid composition. Furthermore, the same sweet effect is noted when the acid composition or acidic fruit juice is added to such food items as cookies, jellies or fruits.

What is claimed is:

1. A method for rendering food sweet tasting which comprises:
   contacting the tongue with material rich in the taste-modifying principle of *Synsepalum dulcificum* Daniell in an amount effective to modify the taste receptors of the tongue, said material being substantially free from the components of the ripe fruit of *Synsepalum dulcificum* Daniell which degrade the taste-modifying principle; and,
   thereafter and while said taste receptors are modified ingesting a mixture of food and non-toxic normally sour-tasting acid, the effective acid molarity of said mixture being in the range of 0.005M to 0.03M.

2. The method of claim 1 wherein said mixture includes sucrose.

3. The method of claim 1 wherein said food is a normally bitter tasting food.

4. The method of claim 1 wherein said mixture having said effective molarity is obtained by mixing with said food an aqueous concentrate of said acid, said concentrate having a molarity in the range of about 0.1M to 0.3M.

5. The method of claim 4 wherein the amount of said concentrate mixed with said food is in the range of 0.1 to 0.7 weight percent of said food.

6. A method for rendering food sweet tasting which comprises:
   contacting the tongue with material rich in the taste-modifying principle of *Synsepalum dulcificum* Daniell in an amount effective to modify the taste receptors of the tongue, said material being substantially free from the components of the ripe fruit of *Synsepalum dulcificum* Daniell which degrade the taste modifying principle; and,
   thereafter and while said taste receptors are modified ingesting a mixture of food and a non-toxic normally sour tasting acid selected from the group consisting of citric acid, malic acid, ascorbic acid, formic acid, acetic acid, and tartaric acid, the effective acid molarity of said mixture being in the range of 0.005M to 0.03M.

7. The method of claim 6 wherein said mixture includes a plurality of acids selected from said group.

8. The method of claim 6 wherein said mixture includes sucrose.

9. The method of claim 8 wherein said acid includes citric acid.

References Cited

Inglett et al., J. Agr. Food Chem., Vol. 13, pp. 284–87, 1965.

SAM ROSEN, Primary Examiner